(No Model.) 5 Sheets—Sheet 1.
H. EHRHARDT.
PROCESS OF AND APPARATUS FOR MANUFACTURING TUBULAR BODIES.
No. 495,245. Patented Apr. 11, 1893.
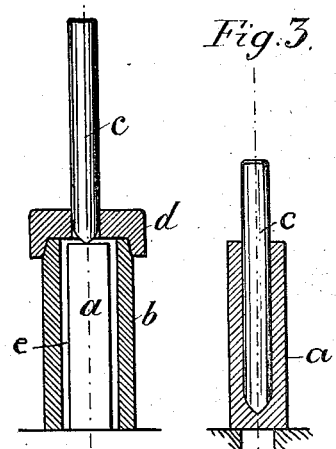
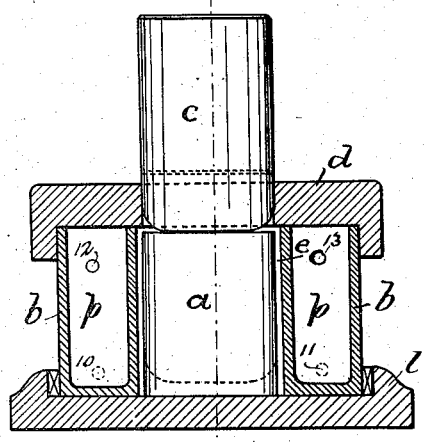
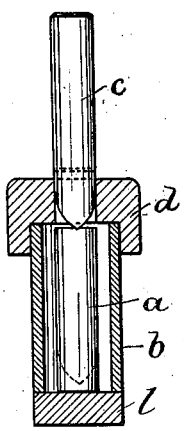
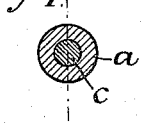
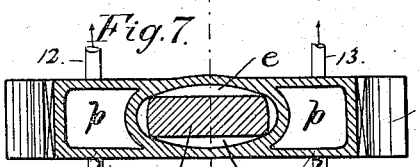
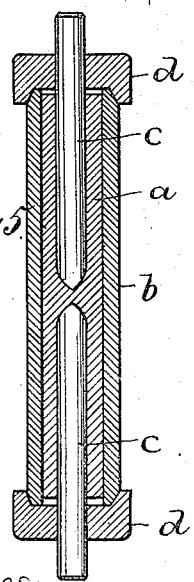
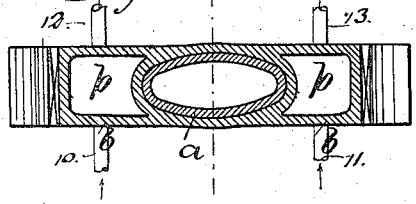
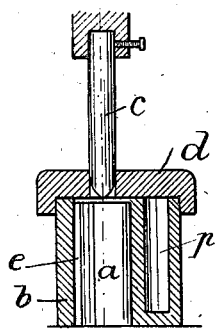
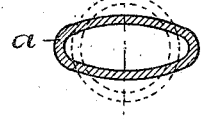
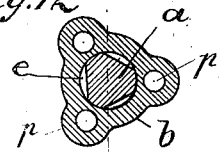
Witnesses:
Inventor
Heinrich Ehrhardt
by A. Faber du Faur
Attorney (No Model.) 5 Sheets—Sheet 2.
H. EHRHARDT.
PROCESS OF AND APPARATUS FOR MANUFACTURING TUBULAR BODIES.
No. 495,245. Patented Apr. 11, 1893.
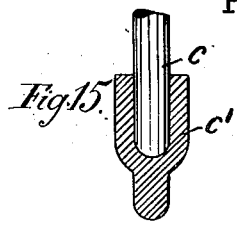
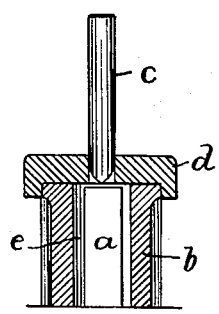
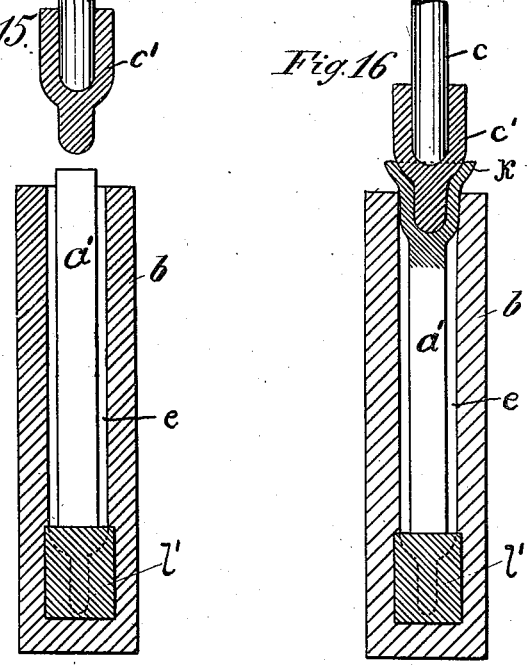
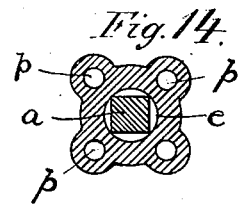
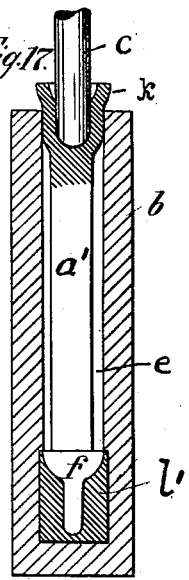
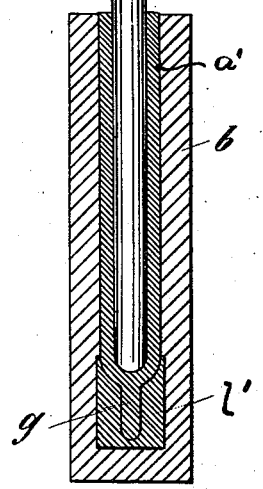
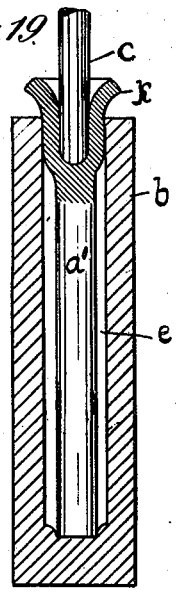
Witnesses:
Klas H. Brustedt
JJ Malle
Inventor
Heinrich Ehrhardt
by A Faber du Faur
Attorney

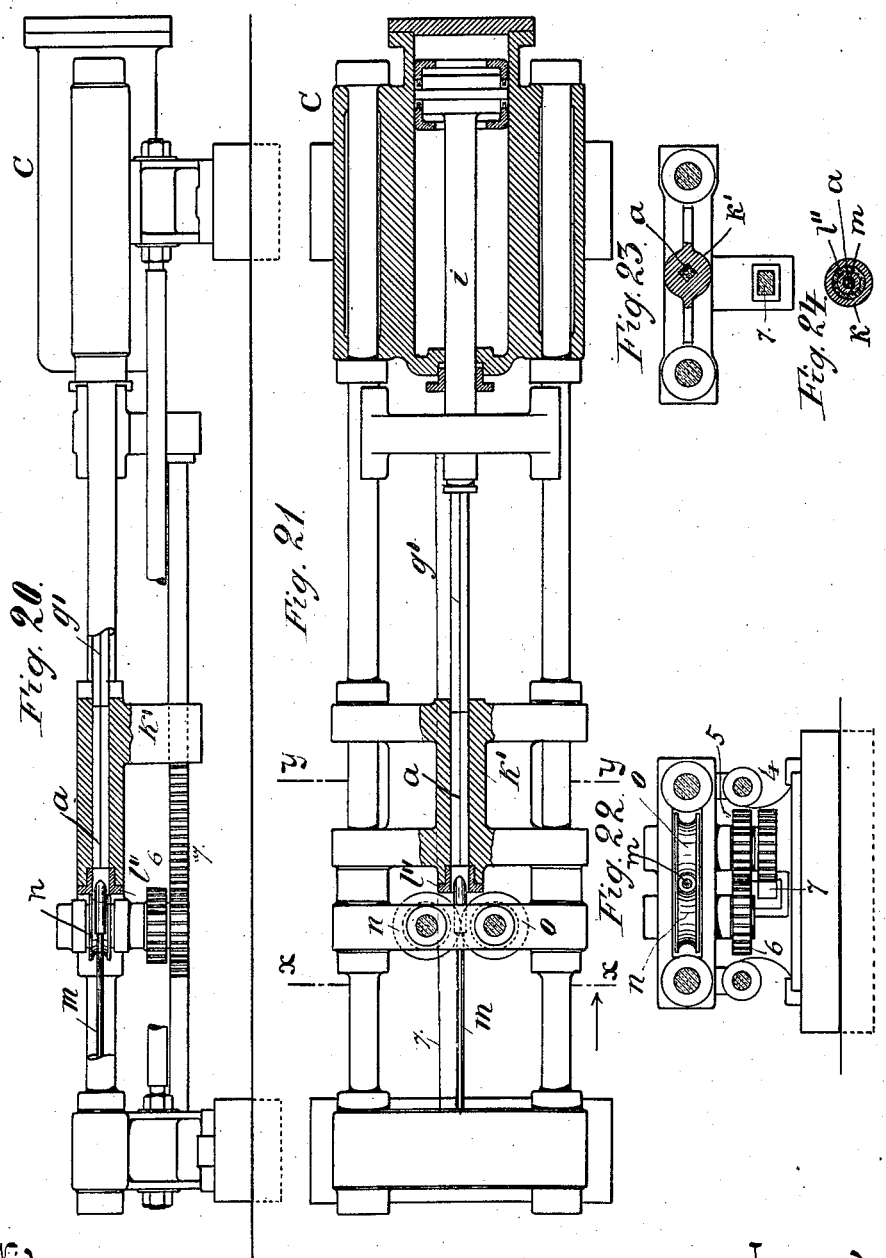

(No Model.) 5 Sheets—Sheet 4.

H. EHRHARDT.
PROCESS OF AND APPARATUS FOR MANUFACTURING TUBULAR BODIES.

No. 495,245. Patented Apr. 11, 1893.

Witnesses:

Inventor
Heinrich Ehrhardt
by his Attorney (No Model.) 5 Sheets—Sheet 5.
H. EHRHARDT.
PROCESS OF AND APPARATUS FOR MANUFACTURING TUBULAR BODIES.
No. 495,245. Patented Apr. 11, 1893.
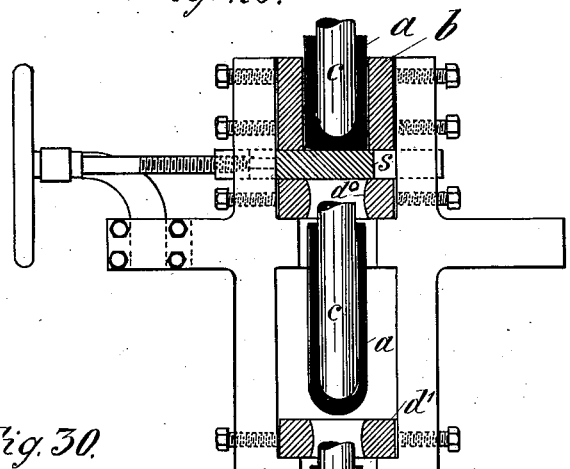
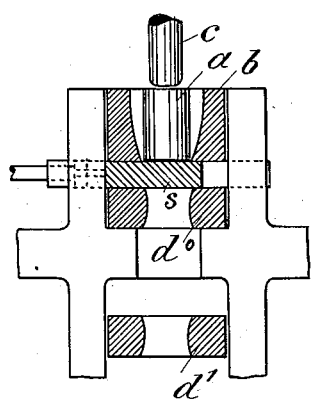
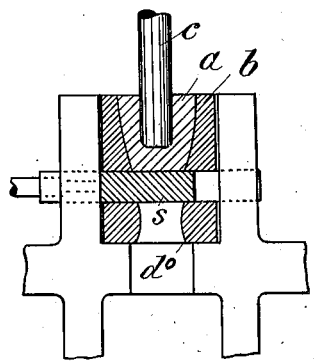
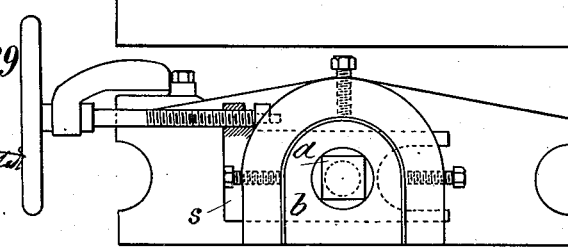
Witnesses:
Inventor
Heinrich Ehrhardt
by Attorney

UNITED STATES PATENT OFFICE.

HEINRICH EHRHARDT, OF DUSSELDORF, GERMANY.

PROCESS OF AND APPARATUS FOR MANUFACTURING TUBULAR BODIES.

SPECIFICATION forming part of Letters Patent No. 495,245, dated April 11, 1893.

Application filed May 19, 1892. Serial No. 433,509. (No model.) Patented in England February 20, 1891, No. 3,116; in Belgium March 9, 1891, No. 94,061; in Sweden March 9, 1891, No. 3,597; in Italy March 31, 1891, XXV, 29,254, LVII, 265; in France June 12, 1891, No. 211,814, and in Austria-Hungary September 22, 1891, No. 26,699 and No. 49,738.

*To all whom it may concern:*

Be it known that I, HEINRICH EHRHARDT, a subject of the Duke of Sachsen-Coburg-Gotha, residing at Dusseldorf, in the Kingdom of Prussia, German Empire, have invented new and useful Improvements in Processes of and Apparatus for Manufacturing Tubular Bodies, (for which I have obtained Letters Patent in Great Britain, No. 3,116, dated February 20, 1891; in France, No. 211,814, dated June 12, 1891; in Austria-Hungary, No. 26,699, Tom. 41, Fol. 2,488, and No. 49,738, Tom. XXV, Fol. 2,468, dated September 22, 1891; in Belgium, No. 94,061, dated March 9, 1891; in Italy, Reg. Gen., Vol. XXV, No. 29,254, and Reg. Att., Vol. LVII, No. 265, dated March 31, 1891, and in Sweden, No. 3,597, dated March 9, 1891,) of which the following is a specification.

My invention relates to improvements in the art of manufacturing tubular bodies from solid blanks or billets, and it consists in certain novel features in the method of procedure and in the apparatus employed; all of which is more fully pointed out in the following specification and claims and illustrated in the accompanying drawings in which:

Figure 1 represents a sectional elevation of a simple form of apparatus for carrying out my invention. Fig. 2 is a transverse section of the same. Figs. 3 to 19 inclusive are sectional views illustrating modified forms of the apparatus and products. Fig. 20 is a sectional elevation of a complete apparatus using hydraulic pressure. Fig. 21 is a sectional plan of the same. Figs. 22 and 23 are vertical sections taken respectively in the planes $x\ x$ and $y\ y$ Fig. 21. Fig. 24 is a sectional detail. Figs. 25, 26, and 27 are sectional planes of a modified form of a similar apparatus. Fig. 28 is a sectional elevation of a drawing mill. Fig. 29 is a top view of the same. Figs. 30 and 31 are sectional views of modifications of the same.

Similar letters and numerals indicate corresponding parts throughout the several views of the drawings.

To produce a hollow cylinder from wrought-iron or steel a blank or billet of square iron or steel $a$ as an example is taken (see Fig. 2 of the accompanying drawings), the cross-section of which, diagonally measured corresponds to the diameter of the hollow cylinder to be produced. Said piece of square iron or steel, when in a red-hot or white glowing state is delivered into the matrix $b$ (Figs. 1 and 2), the hollow space or cavity of which corresponds to the shape of the hollow cylinder to be produced and a pointed core-bar or mandrel $c$ (Fig. 1) is driven then into the metal by means of a hammer or press, while cover $d$ (Fig. 1) is used as a guide for the mandrel. The diameter of the latter is so chosen that the material forced aside by it is sufficient to fill the four segment-shaped spaces $e$ (Fig. 2) and it is well considered, that a certain upsetting of the metal is caused by such procedure. The mandrel enters the metal without any difficulty, as the metal while being forced away can give way at its sides, and a hollow cylinder with closed bottom, as represented in Figs. 3 and 4, is thus produced. Punching or perforating said hollow cylinder may be effected in exactly the same manner by means of a mandrel $c$ (Fig. 3) provided the cylinder be not intended to be employed with a closed bottom.

Hollow cylinders manufactured according to the process above described may be used, for instance, for producing light pipes or rings by drawing or rolling such cylinders.

When desiring to manufacture hollow bodies of prismatic shape, a matrix is used having the respective prismatic inner shape, and a round pipe of metal is employed the diameter of which corresponds to the diameter of the greatest circle within the base of the prism. The process is, on the whole, the same as described above. The piece of metal is centered by the matrix, and the spaces between matrix and metal are filled by the material pressed away or aside by means of the mandrel, as already explained.

For manufacturing hollow bodies of somewhat greater length, two mandrels instead of one may be employed, and they may be pressed into the metal from both sides as shown in Fig. 5. Blocks of irregular cross-section may be punched and shaped in quite the same way, there being, however, the condition, that the piece of metal be centered by the matrix, and that sufficient space be left for receiving the material pressed away by said mandrel or mandrels; the latter may be of any regular or irregular cross-section, for instance of oval shape, as shown in Figs. 6, 7, 8 and 9. The cross-section of the metal to be punched is to be seen from Fig. 7, and Fig. 9 shows the cross-section of the punch piece.

In order to convert the oval tube of metal into a round one (as indicated by dotted lines in Fig. 10) a round mandrel of corresponding greater cross-section may be employed.

The matrix as shown in Figs. 6 and 7 consists of the part $b$, which is closed at its top by a cover $d$ and at its bottom by plate $l$; cover $d$ being used at the same time as guide for the mandrel.

In Figs. 11 and 12 I have shown a blank $a$ of triangular cross-section which is to be converted into a round tube. For this purpose the mandrel $c$ may be attached either to the monkey of a hammer or to the moving part of a press. In special cases the mandrel may be firmly secured to the frame of the press, and the matrix together with the piece of metal to be worked may be lifted; again, in other cases, the apparatus may be arranged so that both mandrel and matrix are moved toward each other.

For better securing the centering and contact of the edges of the blank in the matrix and for furthering the displacement of its free surfaces those parts of the matrix, which are touched by the edges of the metal-piece may be cooled.

In Figs. 6, 7, 8 and 9 the hollow spaces $p$ $p$ of the matrix are filled with water for the above mentioned purpose, and in those matrices shown in Figs. 11 and 12, or 13 and 14 respectively, the hollow spaces $p$ $p$ serve for cooling the matrix by means of water. Any well known means may, if desired, be employed for maintaining a circulation of water through the hollow spaces $p$ $p$,—for instance, as shown in Figs. 6, 7 and 9, the water is conducted thereto by supply pipes 10 and 11, entering near the bottom of the matrix and conducted away by pipes 12 and 13, near the top of the same.

In order to prevent in the above described process of manufacturing hollow bodies the metal blank operated upon from being compressed longitudinally by the driving in of the mandrel, the arrangement shown in Figs. 15 to 18 of the accompanying drawings is employed. $c$ (Fig. 15) is a perforating and pressploved. $c$ (Fig. 15) is a perforating and pressing mandrel of circular cross section. $b$ is a matrix with a cylindrical cavity. $a'$ is the rod or blank to be operated upon of a square cross section. $c'$ (Figs. 15 and 16) is a preparatory pressing mandrel, which, as shown at Fig. 16, forms a collar $k$ on the end of the heated blank. The preparatory mandrel is removed after the formation of such collar, and the blank then has the hole formed through it by the mandrel $c$, as shown at Figs. 17 and 18, while at the same time it is pressed into the matrix $b$ so as to assume its circular configuration. During this operation the collar previously formed prevents any pressing together in the longitudinal direction of the formed tube, as in the first instance it forms an abutment resting on the upper end of the matrix, and during the finishing of the operation it is gradually drawn into the matrix by the pressure of the mandrel, as shown at Fig. 18. At the lower end of the matrix is a sliding block $l'$, which, in the positions shown in Figs. 15 and 16, when the preliminary mandrel is operating, serves as support to the lower end of the blank. After this operation, the slide is pushed forward until a recess $f$ formed therein comes beneath the orifice of the matrix. This recess $f$ serves to form a nipple $g$ on the end of the tubular body during the finishing operation, which nipple is required for the further treatment of the tubular body.

As shown in Fig. 15, the circular cavity of the matrix constitutes the circumscribed circle of the rectangular section of the blank, so that the matrix brings the blank at once into the central position when it is inserted. The cross section of the mandrel is made of such a size, that the material of the blank, which it displaces when forced in, fills out the spaces left between the rectangular sides of the blank and the circular wall of the matrix. On pressing, such an amount of friction is produced against the walls of the matrix, that only a slight longitudinal compression is effected even when the above described collar is not made to bear against the matrix. The friction against the walls of the matrix can be increased by roughing it with file cuts, or by forming grooves therein. In this case the matrix would require to be divided longitudinally in order to remove the finished article.

Fig. 19 shows an arrangement whereby tubular bodies can also be formed out of bars of circular section. It is only requisite for this purpose to first form a collar on the rod in the manner above described.

In Fig. 19 $a'$ is the blank provided with a collar $k$. $b$ is the matrix and $c'$ the pressing mandrel. The bottom of the matrix is so formed as to hold the rod in the central position. The collar $k$ also brings the bar into the central position at the upper end. The diameter of the blank is so chosen, that the material displaced by the mandrel fills out the annular space between it and the matrix. By forming the described collar, which may be cooled before finally pressing the tubular body, not only is the longitudinal compression of the tubular object entirely prevented, but also the tube can be extended in length thereby.

In the foregoing the production of the hollow body by the driving in of a mandrel has been described. Such driving in of the mandrel can however also be utilized when using suitable devices therewith, for producing a simultaneous rolling and drawing of the tubular body, this being effected either by pressing or by drawing. The apparatus for carrying out this extended process is shown in Figs. 20 to 24 of the drawings. The plunger $g$ having the same cross section, as that of the blank to be operated upon, is connected to the piston $i$ of a hydraulic press. The blank $a'$, which has been introduced into the matrix $k'$ of the same section is conveyed by the plunger $g'$, when acted upon by the piston of the hydraulic press, to the matrix $l^2$, into which projects the mandrel $m$. This mandrel is guided by a pair of rollers $n$ $o$ before passing into the matrix $k'$ $l^2$. If therefore, after the perforation has commenced in the matrix $l^2$ $k'$, the blank is forced farther forward by the plunger $g'$, it will be fed forward over the mandrel $m$ toward the rollers $n$ $o$, and these being at the same time rotated at a quicker surface speed, than that of the plunger $g$, they will exercise a drawing action on the blank $h$. The rollers are driven and their speed regulated by spur gearing 4, 5 and 6 which is rotated by means of toothed rack 7 actuated by the piston of the hydraulic cylinder. Thus it will be seen, that by a combined pressing and drawing operation the object acted upon is simultaneously perforated drawn and rolled.

Figs. 25, 26 and 27 show another construction of apparatus for producing hollow bodies according to the above described method. C, Fig. 25, is the pressing cylinder, $i$ the piston rod thereof, to which is fixed the pressing mandrel $c$. A A are stay rods, which are connected at one end to the press cylinder C, and at the other end to the abutment W. The matrix $b$ (Fig. 25,) is carried in a movable manner on the tie rods A A; it has a circular bore while the blank $a$ is of square section. The piston rod $i$ is fixed to the cross head $t$ by means of the key $k^2$. To the cross head $t$ are fixed rods $a^2$ $a^3$; the cross-piece $f'$ serves to guide these rods $a^2$ $a^3$ and the mandrel $c$ and, at the return motion it serves for stripping the formed object off the mandrel. On pressing the mandrel $c$ into the blank $a$ the matrix, $b$ is at the same time pressed backward by the rods $a^2$ $a^3$, that is to say, it is pushed off the blank $a$. After completion of the pressing therefore the perforated object will be situated outside the matrix. In order to prevent any longitudinal compression of the object $a$, the rear part of the matrix may also be made with the same square section as the object, the front part $r$, in which the pressing takes place being formed with the requisite circular section. In this case the abutment $g^2$ is also made with a corresponding square section. Lastly, both the object $a$ and the matrix can have the same circular cross section. In this case the matrix is made of the front part $r$ with an enlargement which is indicated in dotted lines in the drawings Fig. 25. This enlargement receives the material displaced by the inward pressure of the mandrel $c$, and determines the outer diameter of the pressed hollow body. The diameters of the enlargement and of the pressing mandrel $c$ must be so proportioned to each other, that with the given diameter of the object $a$ the material displaced by the mandrel will fill out the enlargement. Or, when the outer and inner diameters of the hollow body to be formed are given, the area of the cross section of the blank must be equal to the area of the cross section of the hollow body to be produced. At Fig. 26 the press is shown provided with a preliminary matrix M, which in the pressing operation is made to bear against the abutments $b^2$ $b^2$. This matrix serves for forming a collar on the object $a$ by means of the mandrel $c'$. After the forming of the collar the mandrel $c'$ is removed and the pressing and perforating of the object are completed by the mandrel $c$. The collar of the object during this operation bears against the matrix M and prevents the longitudinal compression of the object. At the moment when the enlargement $r$ of the matrix is filled out by the displaced material, the rods $a^2$ $a^3$ press against the matrix M and press this backward until the pressing is completed. The collar may, if necessary, be previously cooled with water in order that it may offer sufficient resistance to the longitudinal compression of the object. In Fig. 27 the latter is shown at an intermediate stage, in which the backward pressing of the matrix M by the rods $a^2$ $a^3$ has already taken place to a certain extent. After the production of the hollow body this is drawn and rolled out by means of the apparatus shown at Figs. 20 to 24. Such drawing and rolling to the required section may also be effected immediately after the formation of the hollow body during one and the same heat. The arrangement for this purpose is shown in longitudinal section and end view in Figs. 28 and 29. The iron or steel bar to be perforated is introduced into the matrix $b$ (Fig. 28) and is there perforated in the described manner. The bottom of the matrix is formed by a slide $s$, which is moved in the matrix $b$ by means of a screw spindle and hand wheel or other suitable appliance. Below the matrix are situated, in the same axial line, draw rings $d^0$ $d'$ $d^2$ of gradually decreasing diameter.

The apparatus works as follows: After the matrix $b$ has been closed at bottom by the slide $s$, the metal blank $a$ in the matrix is perforated as described. When the mandrel $c$, which is actuated by a hydraulic cylinder or other suitable means, has been forced to the required depth into the material, the pressure on the mandrel is reduced in order to enable the slide $s$ to be withdrawn. After the slide has been withdrawn, the mandrel $c$ is moved downward together with the tubular body, and passes together with the letter successively through the drawing rings $d^0$ $d'$ $d^2$ until the tubular body has acquired the requisite thickness. Below the last ring is placed a block $e'$ with a suitable hollow for imparting to the end of the body, in the event of this requiring to be closed, the requisite configuration by compressing the same between the said hollow of the block e' and the correspondingly formed end of the mandrel c.

With the described apparatus the iron or steel bar is, during one and the same heat, converted into a hollow body and then brought to the required sectional dimensions.

In the appliances illustrated in Figs. 28 and 29 an iron or steel bar of prismatic section has been used for manufacturing hollow bodies and the perforation of the blank has been effected in the longitudinal direction. But it is not absolutely necessary to employ a long prismatic blank a short round piece of iron or steel, such as shown in Figs. 30 and 31 may also be used. The matrix is in this case of a peculiar shape as its hollow space increases upward in width, while at bottom the diameter of the hollow space corresponds to the diameter of the blank to be perforated.

Fig. 30 is a vertical section of the matrix with the introduced short blank, while the mandrel c is in contact with the blank.

Fig. 31 shows the blank a and the mandrel c after the perforation has been effected. When the blank has been shaped as shown in Fig. 31 the slide s is removed and the hollow body is drawn as above described with reference to Figs. 28 and 29.

I claim—

Figure 25:
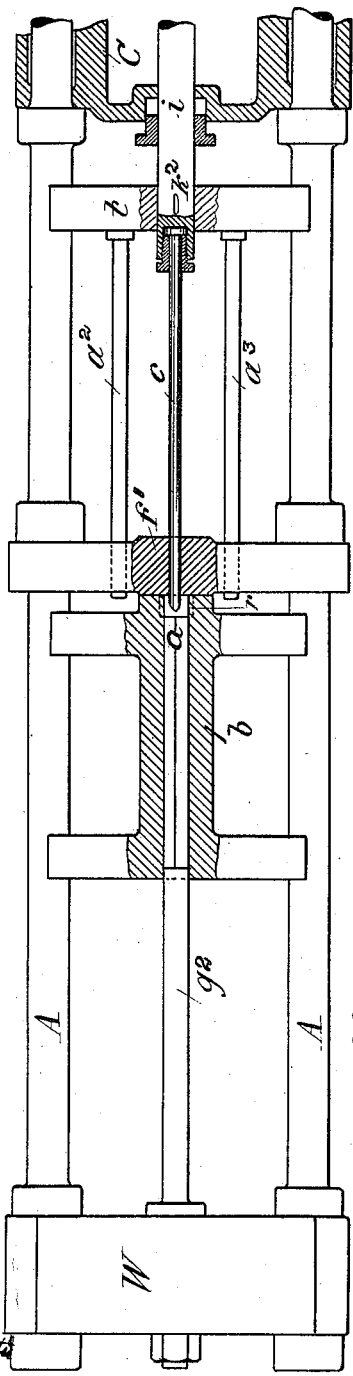
Figure 27:
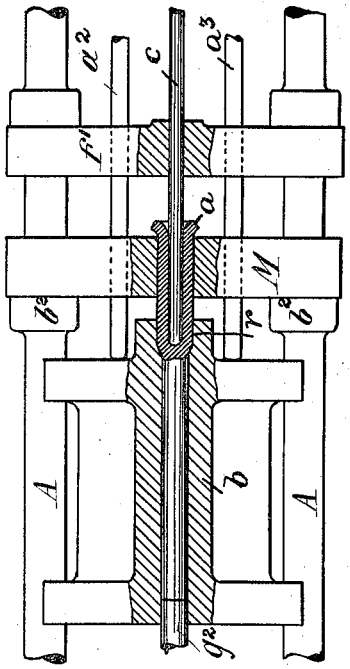
Figure 26:
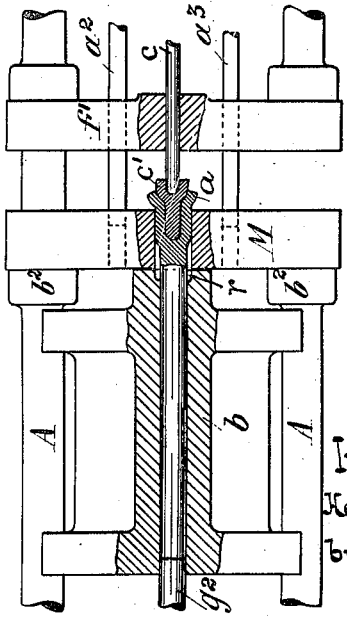

1. The method of manufacturing tubular bodies from metal blanks, consisting in placing the blank while in a heated condition into a matrix, then subjecting the same while in the matrix to the action of a perforating mandrel and permitting radial displacement of the metal, substantially as described.

2. The method of manufacturing tubular bodies from metal blanks or billets, consisting in subjecting the heated blank to a longitudinal perforating action and permitting lateral displacement of the metal, substantially as described.

3. The method of manufacturing tubular bodies from metal blanks, or billets, consisting in first forming a collar on the blank and then perforating the blank while suspended by the collar, and permitting lateral displacement of the same, substantially as described.

4. The method of manufacturing tubes from metal blanks or billets, consisting in subjecting the heated blank in a matrix to a longitudinal perforating action while permitting lateral displacement of the metal, and then reducing the tubular body thus formed, substantially as described.

5. In an apparatus for manufacturing tubular bodies from metal blanks or billets, the combination of a matrix having a cavity permitting lateral displacement of the metal, a mandrel arranged on line with said matrix for perforating the blank or billet, grooved rolls located at the end of the matrix and on opposite sides of the mandrel for simultaneously rolling the blank, and means for forcing the blank over the mandrel, substantially as described.

In testimony whereof I have signed my name to this specification in the presence of two subscribing witnesses.

HEINRICH EHRHARDT.

Witnesses:
 LUDWIG GLASER,
 GUSTAV HÜLSMANN.